United States Patent [19]

Shulver et al.

[11] Patent Number: 4,692,988
[45] Date of Patent: Sep. 15, 1987

[54] SCREW THREAD PROTECTION

[75] Inventors: Roderick L. Shulver; John Misselbrook; Robert Standen, all of Great Yarmouth, England

[73] Assignee: Nowsco Well Service (U.K.) Limited, Norfolk, England

[21] Appl. No.: 897,804

[22] Filed: Aug. 19, 1986

[51] Int. Cl.⁴ .................. B23P 25/00; F16L 17/00
[52] U.S. Cl. ................................. 29/458; 285/355
[58] Field of Search ............... 29/458; 285/355, 390

[56] References Cited

U.S. PATENT DOCUMENTS

| | | | |
|---|---|---|---|
| 3,002,770 | 10/1961 | Chesnut et al. | 285/355 |
| 3,069,387 | 12/1962 | Allen et al. | 285/355 |
| 3,146,142 | 8/1964 | Maly | 285/355 |
| 3,541,070 | 11/1970 | Ahrabi et al. | 285/355 |
| 3,683,675 | 4/1972 | Schaefer | 285/355 |
| 3,687,493 | 8/1972 | Lock et al. | 285/355 |
| 3,869,393 | 3/1975 | Booker | 285/355 |
| 4,074,011 | 2/1978 | Teramae et al. | 428/422 |

FOREIGN PATENT DOCUMENTS

| | | |
|---|---|---|
| 0061553 | 3/1981 | European Pat. Off. . |
| 2051891 | 3/1971 | France . |
| 2258557 | 11/1974 | France . |
| 2427383 | 11/1978 | France . |
| 52-35026 | 3/1977 | Japan . |
| 52-10281 | 8/1977 | Japan . |
| 54-90991 | 7/1979 | Japan . |
| 706332 | 3/1954 | United Kingdom . |

Primary Examiner—Howard N. Goldberg
Assistant Examiner—Steven Nichols
Attorney, Agent, or Firm—Leydig, Voit & Mayer

[57] ABSTRACT

A method of protecting mating screw threads at least under tightening torques is described in which a dry lubricant such as molybdenum disulphide is applied to one screw thread, and a liquid lubricant is applied to the other screw thread. The screw threads are then tightened to the required torque value. When completely mated the leakage path will not be masked as a result of volatilization of any of the components of either lubricant.

34 Claims, 13 Drawing Figures

SCREW THREAD PROTECTION

This application is a continuation-in-part of application Ser. No. 610,568 by Roderick L. Shulver dated May 15, 1984, now abandoned.

BACKGROUND OF THE INVENTION

1. Field of the Invention

This invention relates to screw-thread protection.

2. Summary of the Prior Art

It is conventional practice in tubing (pipeline) couplings to make use of a dope or sealant applied to mating screw threads with the intention of lubricating the threads and minimizing the risk of leakage. Such dopes may give rise to no difficulty in use when the internal pressure in the pipeline is low and the ambient temperature is modest (i.e. room temperature) but substantially greater difficulty may be encountered where high pressures and temperatures are involved such as, for example, in production and reinjection tubing strings for oil and gas wells.

The problems of high pressures in gas and oil wells have resulted in the development of lubricants (or dopes) with a hydrocarbon grease base and with the addition of comparatively large particles (of the order of 100 microns) of copper, graphite, zinc, lead or other materials or mixtures thereof. These will tend to accumulate in the root helices of the mating screw threads and in theory these particles will prevent the establishment of helical leakage paths. However, the effect of high temperatures results in a lowering of the viscosity of the grease base and in conjunction with the high pressure allows a leakage path to be established between the comparatively large particles. The leakage path along the screw-thread would have no serious consequence provided that the especially provided sealing surfaces were themselves fully engaged and thus effective, but there is a possible risk that the sealing surfaces themselves are not, in practice, fully effective if the tightening torque has not fully engaged the thread sealing surfaces or other final abutment of the two mating threads. There is also a risk that the sealing faces themselves may be damaged.

Tests have been applied to tubing strings (pipelines) prior to installation to detect any existing leaks, but the dopes hitherto used have masked the leaks which only become apparent when the tubing is in use. Thus, conventional and previously proposed dopes which ostensibly prevent leakage in damaged or defective couplings, in practice merely mask the leaks until the tubing is run in the well at which time it is difficult and expensive to remedy the leaks.

It would therefore be desirable, when testing tubing connections for leak tightness, to avoid the use of dopes with coarse particles and a viscous carrier which can temporarily prevent a leakage flow passing through.

The use of liquid lubricants effective to prevent direct physical contact between relatively rotating parts is so conventional in engineering practice over hundreds, if not thousands of years that detailed discussion is superfluous. Over the past thirty years it has become common practice to add to liquid lubricants, what are known as dry film lubricants which form deposits on surfaces to be protected against galling in the event of temporary overload conditions. In all rotary bearing situations however, it has been the standard practice to add the dry film lubricant to the liquid lubricant. There would be no gain, and some additional cost of the mating parts were to be coated with dry film lubricant in a separate process. It follows that the previously very well known practices in the rotary bearing art provide little or no guidance to the person of skill who is faced with the problem of overcoming the defects of "dopes", well known in the art of preventing leaks in tubing or piping screw-threaded points.

An object of the present invention is to provide a method of protecting screw-threads and of reducing the risk of masking eventual leaks along the mated threads.

SUMMARY OF THE INVENTION

According to the present invention there is provided a method of protecting mating screw thread means including first and second screw threads, and associated sealing surfaces at least under tightening torques, the method comprising the steps of applying a dry film lubricant to the screw thread means, applying a liquid lubricant to the screw thread means, mating the screw thread means, and tightening to the required torque value, the liquid lubricant having substantially no solvent action on the dry film lubricant, good wetability and low viscosity and being non-volatile and non-chemically reactive and the method serving both to protect the mating threads and to avoid any subsequent masking of any leakage path between the screw threads.

Preferably, the dry film lubricant contains soft metal flakes in order to increase the load bearing capacity of the film when cured.

Further according to the present invention there is provided a method of protecting the screw threads and associated sealing surfaces of mating screw-threaded members at least under tightening torques, the method comprising the steps of spraying a dry film lubricant incorporating soft metal flakes having a thickness in the range 15 to 150 microns in a volatile carrier on to one of the screw-threads, allowing the carrier to evaporate and the dry film to harden, then applying a liquid lubricant to one of the screw-threads, mating the screw-threads, and tightening to the required torque value, the liquid lubricant having good wetability and low viscosity and being non-volatile and non-chemically reactive, and the method serving to protect the screw-threads and sealing surfaces against mutual damage and to prevent masking of any leakage path under test conditions.

DESCRIPTION OF THE PREFERRED EMBODIMENT

Figure 1:
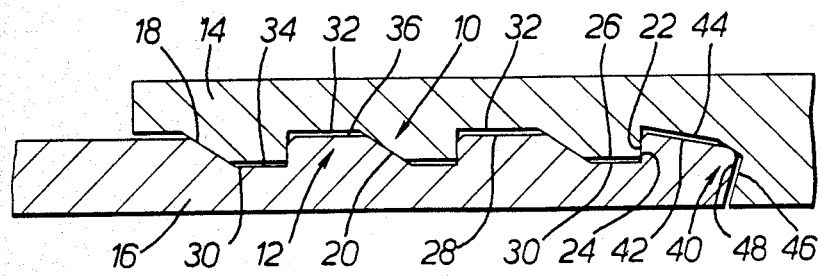
FIG. 1 is a fragmentary, longitudinal, section of a conventional screw-threaded parts assembly such as incorporated, for example, in oil and gas well tubing strings.

Referring now to the drawing, the screw-threaded parts are shown with clearances exaggerated for the sake of clarity. Such parts have thread forms known generally as buttress threads and are used extensively in tubing coupling arrangements for the oil and gas well industries, for example tubing strings and casings.

The screw threads 10, 12 of the parts 14, 16 of the assembly each have inclined flanks 18 and 20 and flanks 22 and 24 extending substantially normally to the length or longitudinal axis of the tubing. The crest 26, 28 of one thread substantially lies respectively at the root 30,32 of the other assembly and vice versa, as is conventional in all screw-thread forms. It is not practical to shape the crest 26, 28 of one thread to make a tight fit with the root 30,32 of the other and hence helical gaps 34,36 are formed. The flanks 18, 20 and 22, 24 are a tight fit and will not normally provide any leakage path.

In buttress thread forms whenever complete sealing is necessary, such as that shown, at least one metal-to-metal annular sealing zone 40 is incorporated, the dimensions being such that when the threads are fully engaged and tightened, the sealing zones will be in compressive contact so that no leakage can occur.

As will be seen in the drawing, the seal surfaces, extending generally axially 42,44 lie at one end of one part 16 and inwardly of the end of the other part 14. The surfaces of sealing zone 40 are mutually compressed when the threads are fully torqued with shoulder surfaces 46,48 in tight contact. To effect the required degree of compression in the surfaces of the sealing zone 40, they are so disposed relatively to one another that contact is made slightly in advance of the angular location at which shoulders 46,48 abut so that when the shoulders abut fully the sealing surfaces are slightly deformed under the compression loading. For the sake of clearly illustrating the surfaces, in particular the surfaces 42,44,46 and 48, they have been shown spaced apart, but when fully torqued the opposed abutment surfaces 46, 48 will be in tight contact and each pair would be shown only as a single line. The surfaces 42, 44 are not in contact even when the parts 14, 16 are subjected to full torque.

The screw threads illustrated in FIG. 2 are again formed on two opposed parts 50,52 having respective crests 54,56 and troughs 58,60 which are defined by the helical threads of trapezoidal form. In this conventional thread form however, in some cases the last turn 62 of the thread of part 50 is generally of triangular section while the corresponding turn of the part 52 remains trapezoidal. This results in a substantially annular clearance 64 so that contact does not take place at the helical lines 66 and 68 when the parts 50,52 are fully torqued. An end portion 70 of the part 50 has an external surface 72 (i.e. facing away from the longitudinal axis of the part) which is generally annular but convex as viewed in cross-section. This surface 72 co-operates with a corresponding annular internal surface 74 which is concave as viewed in cross-section but the curvature differs so that, as is apparent from FIG. 2 contact takes place between surfaces 72 and 74 only over a relatively small proportion of the areas of each surface. Actual deformation at the annular contact surface zone 76 takes place so that, in theory the seal is perfect. Surfaces 78,80 which correspond to surfaces 46,48 of FIG. 1, are in abutment when fully torqued, but have been illustrated as spaced from one another to enable the individual surfaces to be seen.

However, it is conventional practice liberally to coat the whole of the screw-threads of the types just described with a hydrocarbon-grease-based lubricant and secondary sealant (conventionally termed "dope") containing soft metal particles of various sizes up to about 100 microns and at full torque this "dope" congregates in the helical gaps 34,36 and 64. The "dope" also becomes trapped in the sealing zones 40,76 and can impair the sealing action by allowing the full torque to be applied prematurely to the surfaces of sealing zones 40, 76 because the shoulders 46,48 (FIG. 1) 78, 80 (FIG. 2) cannot properly abut. Indeed pipe and coupling manufacturers specify torque correction factors which depend on the particular dope used and if these factors are ignored there is a substantial risk that a seal effective at pressures of the order of 420 kg./sq. cm., and possibly higher, will not be formed. If these factors are ignored, there is also a risk of excessive torques leading to damage to the sealing surfaces.

The absence of such effective seal is generally regarded not to be important particularly in the early life of the well, because the dope in the helical gaps 34,36,64 will prevent leakage. In some cases the high temperatures encountered in some wells will reduce the viscosity of the hydrocarbon vehicle and the metallic particles will not alone block the leakage because the spaces between the particles can readily allow the build up of a path for leakage, particularly under high pressures.

Leakages of this kind cannot always be detected before installation because of the presence of the dope, even if a sophisticated test as described in our co-pending application Ser. No. 610,568 assigned to the same assignee, Nowsco Well Service (U.K.) Limited is employed. The reason for the apparent failure of the test to detect a leak is the dope itself, one of the roles of which is intended to be the permanent prevention of leakage. High temperatures are assumed to be accommodated by the soft metallic particles, but the large size provides a leakage path too readily in the absence of the grease. It is a known property of molybdenum disulphide that it will bond with a steel surface so that a molecular thickness layer of $MbS_2$ can be produced. Molybdenum disulphide in an oleaginous vehicle is well known as a lubricant for moving parts and is added to the normal lubricating oil.

Figure 2:
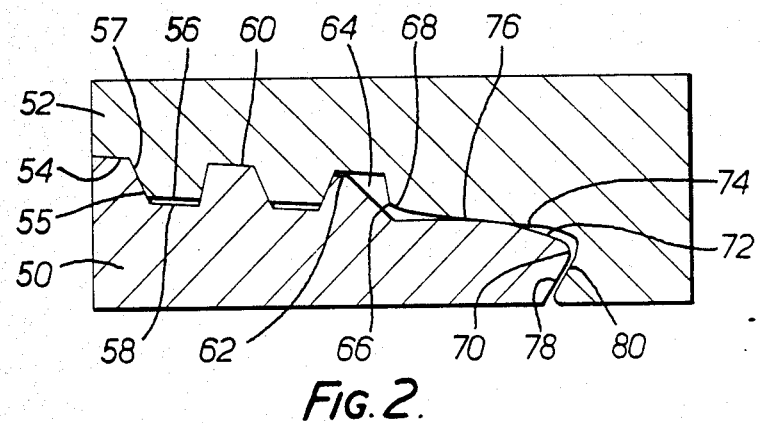
FIG. 2 is a fragmentary, longitudinal, section of another conventional screw-threaded parts assembly, similar to that of FIG. 1, and referred to as a casing string.

The essential feature of the preferred method in accordance with the invention is that prior to the assembly of two screw-threaded steel (or steel alloy) parts for example of the form illustrated in FIG. 1, or in FIG. 2 a dry film layer of for example molybdenum disulphide or a colloidal element such as graphite or polytetrafluoroethylene is applied to one of the mating screw threads before assembly, preferably to the female thread, (thread of the box of the coupling). The molybdenum disulphide or other dry film lubricant is carried in a low viscosity carrier, such as trichlorethylene, trichloroethane or one of the fluorchlorohydrocarbons, the latter being particularly useful if the active constituent is to be applied in aerosol form, which leaves a thin layer on the screw thread and in particular on the otherwise metal-to-metal contact parts of the sealing zone 40,76 and on the thread flanks 18 and 22 (FIG. 1) 55,57 (FIG. 2). The layer applied to the crest and trough surfaces 30,36 (FIG. 1) 54,56,58,60 (FIG. 2) is ineffective since the purpose of the layer on the seal surfaces and on the flanks is to prevent galling when the threads are tightened or slackened off. The proportion of molybdenum disulphide in the low viscosity or volatile vehicle will normally amount to no more than 10% by weight, although proportions ranging from ½% to 25% are possible. After the molybdenum disulphide has been sprayed on, it is left to dry for a short period prior to mating the threads. A Ketonic resin is preferably used to give rapid bonding of the film to the screw threads.

Although it is preferred to use a compound such as molybdenum disulphide because of its strong affinity for steel and steel alloys, colloidal graphite, or polytetrafluorethylene-based substances may also be used. Certain of these materials withstand temperatures up to at least 400° C. The molybdenum disulphide or other dry film lubricant forms one protection agent of the method.

The molybdenum disulphide or other dry lubricant is preferably applied as a mixture of the dry lubricant, a resin and the low viscosity carrier. Any resin can be used which will adhere as a dry film to a metal surface however the resin used is preferably Ketonic resin.

Preferably, in order to increase the load bearing strength of the dry film lubricant, it incorporates copper or other soft metal flakes such as nickel, zinc or aluminium of a thickness in the range of 15 to 150 microns and in an amount in the range 1% to 10% by weight of the dry film lubricant in its vehicle, as applied. In contrast to the problems hereinbefore referred to which have hitherto arisen with well known dopes incorporating soft metal particles, the use of soft metal flakes involves no formation of leakage paths subsequent to exposure to high temperatures, because the dry film lubricant is resistant to high temperatures so that it forms a permanent matrix maintaining the metal particles immovable and since the dry film lubricant is a solid at such temperatures it cannot be displaced by high pressures. The metal flakes ensure that the pressure applied to the dry film lubricant will not be higher than the film can withstand.

The use of a dry film lubricant alone i.e. without any liquid lubricant has the disadvantage that as the tightening torque applied to the coupling brings the threads to a small angular distance from abutment of the shoulders 46,48 (FIG. 1) 78,80 (FIG. 2) the applied torque rises steeply because of the absence of hydrodynamic (pressure) lubrication as with conventional dopes. Hydrodynamic pressure will build up wherever there is contact. In general, the torque necessary over the final turn is higher than that required for conventional API (American Petroleum Institute) modified pipe dope.

In order to reduce the torque, particularly as it approaches the maximum value, the female screw-thread (the pin thread) is coated with a fluid modifier (liquid torque modifier) which, is not a solvent for the dry film lubricant previously applied to the female thread. A suitable fluid modifier is a low viscosity material such as a fluorocarbon and this may incorporate a corrosion inhibitor. An effective fluorocarbon is marketed by Minnesota Mining & Manufacturing Company under their Registered Trade Mark FLUORINERT FC-40. Other suitable fluorocarbons are grades of FLUORINERT other than FC-40 and fluorocarbons manufactured by Montedison S.p.A. under the trade names FOMBLIN and GOLDEN. These materials are collectively known as perfluoropolyethers. The liquid modifier lubricant can be considered as a second protection agent. Alternatively, if the male thread is coated with dry film lubricant, then the "wet" lubricant may be applied to the female thread.

Figure 3:
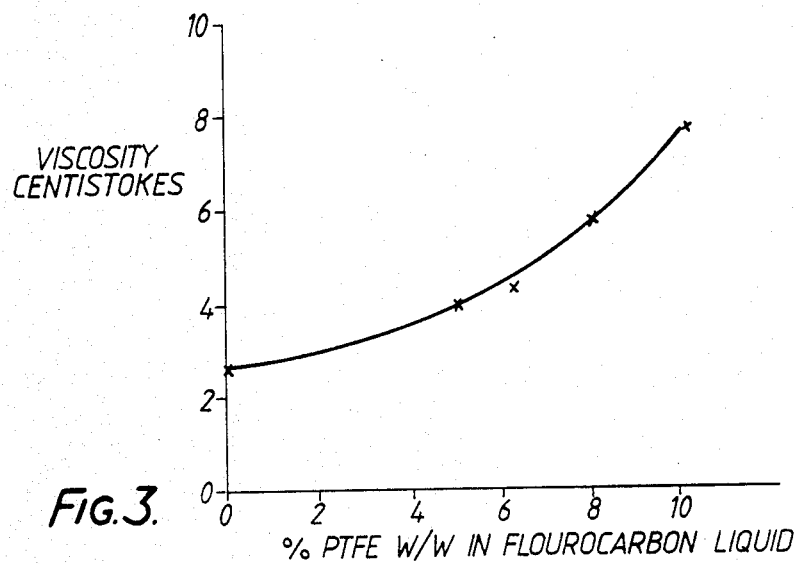
FIG. 3 is a graph plotting viscosity against the percentage by weight of PTFE in a photocarbon liquid lubricant.

Preferably the liquid lubricant is a flurocarbon and contains a dispersion of finely-divided polytetrafluoroethylene (PTFE). The size will be in the range 0.5 to 50 microns. Preferably 6.5% by weight of the liquid lubricant is PTFE and the maximum amount is 20% by weight; the graph of FIG. 3 illustrates the significant reduction in torque effected by the addition of PTFE.

An alternative although not preferred typical formulation for the wet lubricant is 50% water, 47.9% methanol, 2.0% corrosion inhibitor (for example "CRODIN'-'—Registered Trade Mark) and 0.1% friction reducer (for example FC 760) which also acts to lower the surface tension and so improve wetability. More generally, the wet lubricant in this alternative is aqueous and contains both a wetting agent/surfactant as well as a corrosion inhibitor.

As a further alternative to the water-based "wet" liquid lubricant, silicones can be used, including fluorinated silicones. A generalized requirement for the "wet" lubricant is that it should have good wetability, low viscosity and be capable of retaining these properties at low temperatures, say down to −40° C. It should also be chemically non-reactive and non-volatile.

Under certain circumstances, more particularly when the screw-threads are not immediately mated after coating with dry film lubricant, it is desirable that a corrosion inhibitor should either be incorporated in the dry film or in the liquid lubricant or should be applied to one or other or both of the threads.

In order to ensure that the screw-thread protection is effective for the whole of any given screw thread, it is desirable that the thread should initially be cleaned thoroughly. One way of effecting this is the application of an aerosol of air and grease solvent sprayed on to the thread in question and immediately thereafter the dry lubricant is sprayed on the box thread and allowed to dry fully before the "wet" lubricant is applied to the pin thread. Evaporation of the grease solvent may be encouraged by an air blast.

It is conventional that slackening torques can be of the order of 40% higher than tightening torques. The protection agents used in methods in accordance with the invention do not substantially affect this characteristic irrespective of whether the dry protection agent is present during the slackening operation or both agents are present. This higher slackening or break-out torque is desirable since otherwise there is some risk that the coupling will slacken (back-off) inadvertently.

The following are test results comparing various parameters of the protection agents in accordance with the invention and of a conventional API modified dope.

|  | DRY FILM PROTECTION AGENT IN ACCORDANCE WITH THE INVENTION | API MODIFIED DOPE |
|---|---|---|
| TORQUE MULTIPLIER | 1.1 (with liquid torque modifier) | 1.0 |

| | -continued | |
|---|---|---|
| TYPICAL BREAKOUT TORQUE (AS PERCENTAGE OF MAKE-UP) | 125% | 128% |
| COEFFICIENT OF FRICTION (1 KN LOAD AMSLER TEST) | 0.04 (Dry film only) | 0.12 |
| CURING TIME - TOUCH DRY (20°) | 2 MINS | NOT APPLICABLE |
| APPLICATION TEMPERATURE RANGE OF PIPE | +5° to 40 C. | −20° C. to 40° C. |
| MAXIMUM OPERATING TEMPERATURE | 350° C. | 148° C. |
| OXIDATION ABOVE | 400° C. | 177° C. |
| MELTING POINT | 1800° C. | LOW |
| SPECIFIC GRAVITY | 1.4 TO 1.3 | 1.82 |
| FILM DENSITY | 0.6 MG/CC | 8.8 MG/CC |
| TYPICAL COAT THICKNESS | 0.0005 | 0.004 |
| HARDNESS (MOH'S SCALE) | 1 to 15 | NOT APPLICABLE |
| FALEX BREAKDOWN LOAD | 2500 LB. | 750 LB |
| TIMKEN TEST LIFE AT 420 Kg/Sq. cm. | 60 mins. | Less than 15 minutes |
| RESPONSE TO 30 STANDARD CUBIC FEET PER YEAR LEAK THROUGH 4¼" COLLAR (11.43 cm) | 30 secs. | None |
| APPEARANCE | Matt grey | Dark grey |
| APPLICATION | Spray | Brush |
| COMPOSITION | 90% Solvent 10% Active | 36% Grease 64% Solids |
| Ingredients Graphite, Lead Zinc, Copper | | |

The figures given above in relation to the torque and to the modifier apply to the final make-up torque.

Although it is preferred to spray the dry film lubricant on the female thread followed by the liquid lubricant or liquid torque modifier on the same thread after the solid lubricant has cured, it is possible to apply both lubricants to the male thread. Also the dry film lubricant may be applied to the female thread and the liquid lubricant to the male thread. Finally, the reverse arrangement of dry film on the male thread and liquid lubricant on the female screw-thread is possible.

The method hereinbefore described will ensure that any leak detection tests on tubing strings before installation will not be falsified after installation as a result of the reduction of the viscosity of the hydrocarbon grease of conventional coupling sealant dopes. The thin film produced by the dry film thread protection agent will not impair the sealing action of the thread flanks or of the specific sealing zones at the ends of the screw threads. Any leakage at the specific sealing surfaces 42,44,76 of the illustrated screw threads will not be masked since the helical path between helical surfces will be blocked only by the low viscosity aqueous material or the other wet lubricant and any leakage flow through the helical path will merely form a passage through the material. The agents serve to eliminate (or at least reduce the risk) of galling of the threads thus making uncoupling and recoupling possible. The very small particle size—of the order of one micron—eliminates the risk of leakage paths being formed in the sealing zones.

The addition of a liquid modifier protection agent c when used with the dry film lubricant serves to reproduce make-up and break-out characteristics (torque) of traditional lubricants/sealants (dope) currently in use.

FIGS. 4 to 10 further illustrate the advances provided by various methods and materials in accordance with the invention in comparison with API and API modified dopes.

Figure 6:
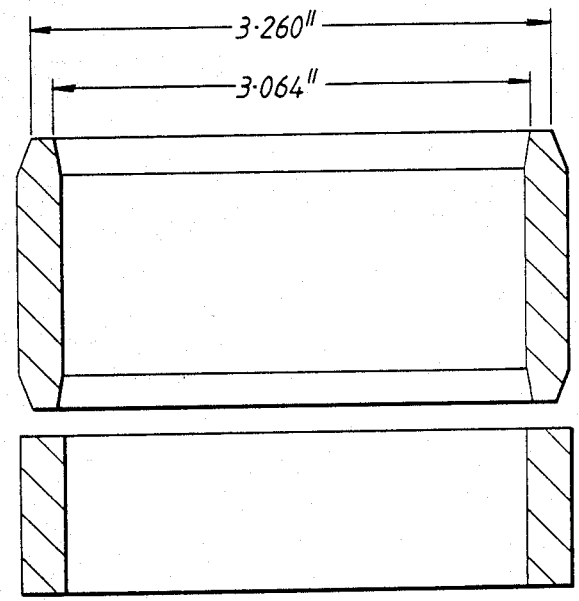
FIG. 6 illustrates in longitudinal section an angular contact friction test piece.
Figure 7:
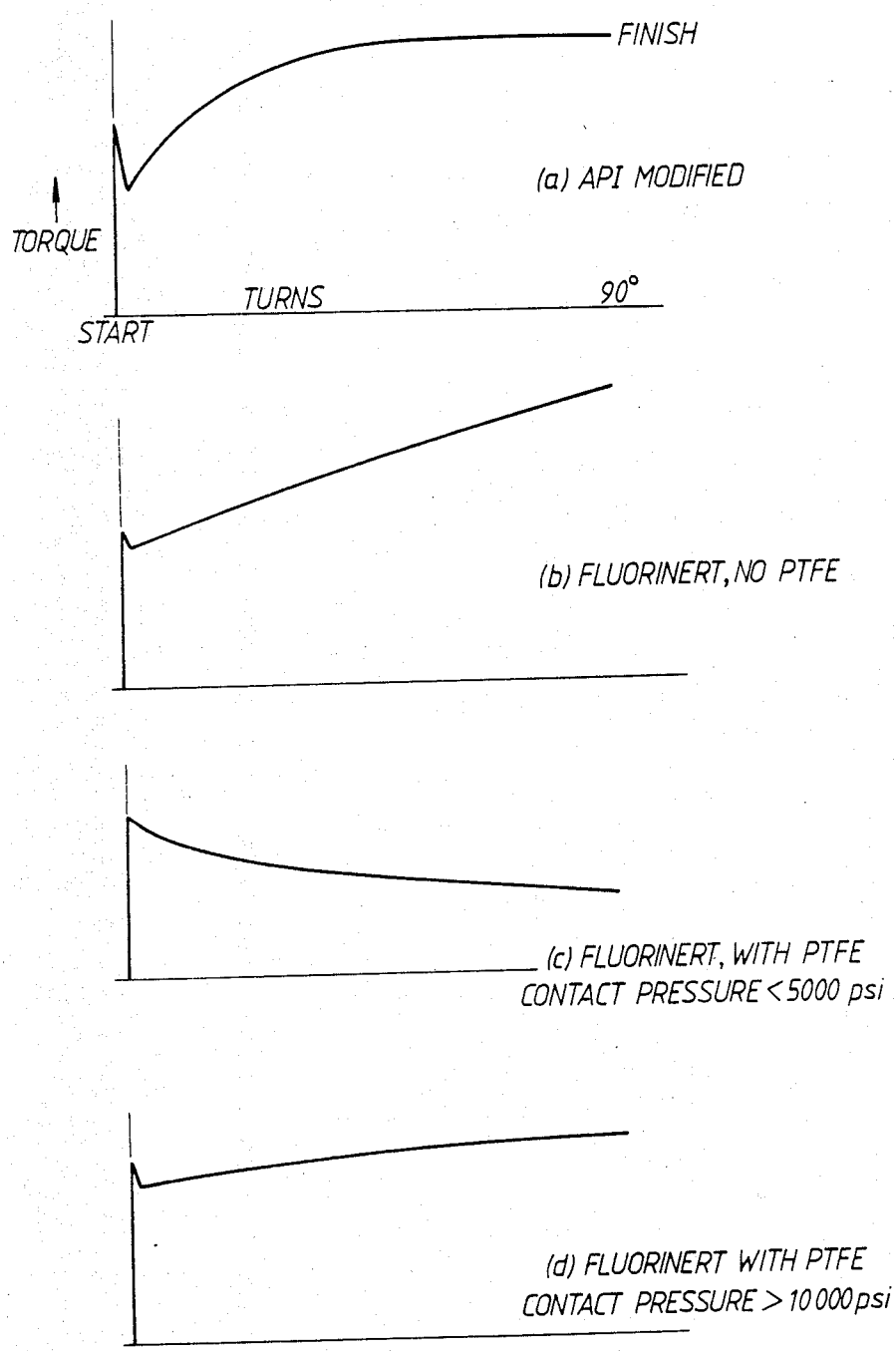
FIG. 7(a) to (d) illustrate typical torque-turns curves.

An annular contact friction testing jig was designed to compare the coefficients of friction of the method and material in accordance with the invention and API dope under conditions simulating shoulder contact and eliminating screw-thread and seal effects. The test pieces were cylindrical sections of N-80 steel, as shown in FIG. 6. In testing, the test pieces were clamped together using a hydraulic ram and a thrust bearing. A torque arm was coupled to the rotating piece. Strain gauges on the torque arm and a turns transducer were coupled to an X-Y plotter. The torque arm, 15 ft long, was operated by hand and could turn the test piece through ¼ of a turn. Rubbing speed during the test was approximately 4 rpm. Tests were carried out using contact pressures between 1,000 and 58,000 psi with API modified, a liquid torque modifier in accordance with the invention without PTFE, and a liquid torque modifier in accordance with the invention with PTFE. The actual liquid torque modifier throughout the tests was the fluorocarbon, FLUORINERT FC-40 hereinbefore referred to.

Figure 4:
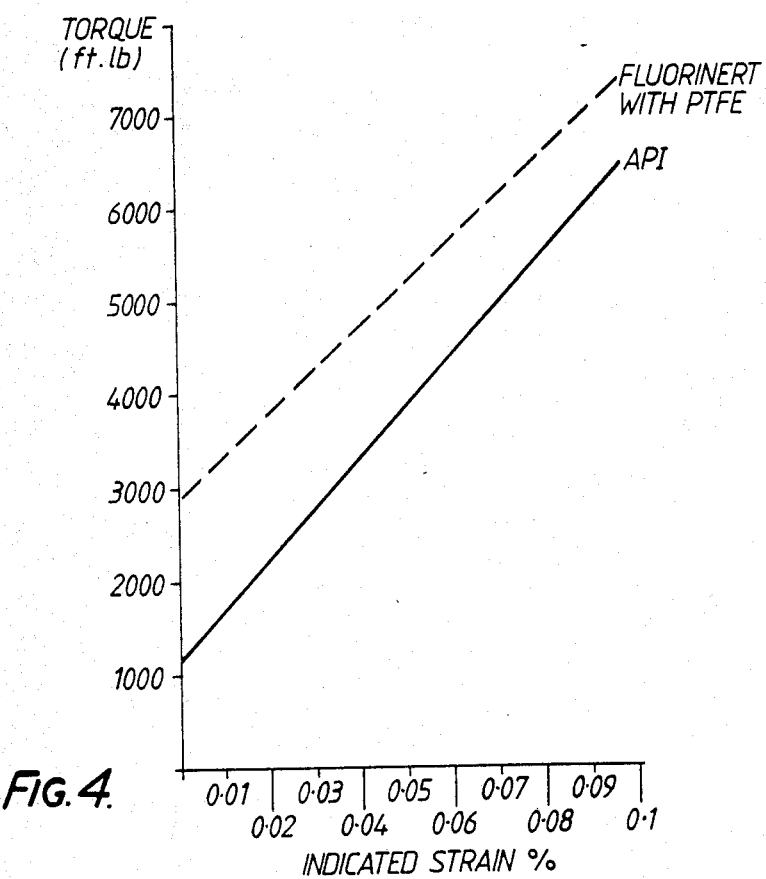
FIG. 4 is a graph plotting torque against indicated strain.
Figure 5:
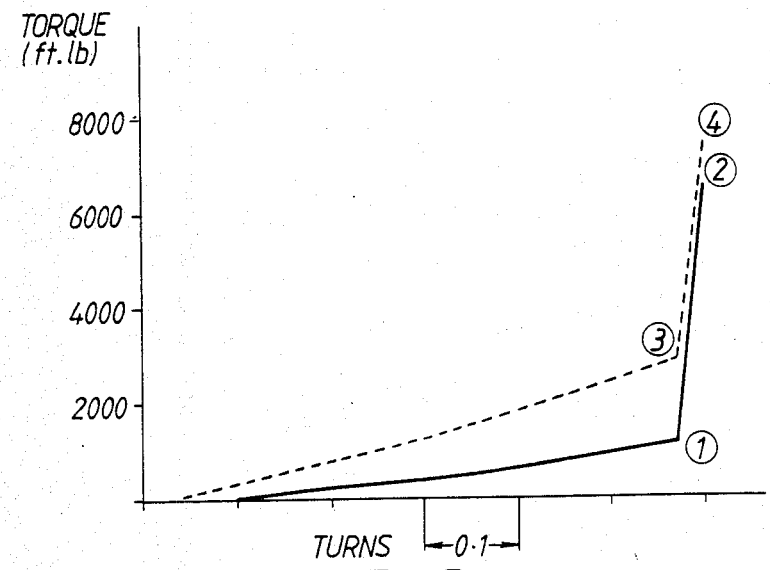
FIG. 5 is a graph plotting torque against turns of the screw-threaded parts.

FIGS. 4 and 5 disclose pipe make-up data. The tests employ strain gauges inside the boxes (female threads), adjacent to the shoulder (see FIGS. 1 and 2). The purpose of these tests was to demonstrate that for fluorocarbons such as FLUORINERT FC-40 the true torque correction factor based on the % strain produced in a joint at recommended torques, is close to unity.

In FIG. 5 reference is made to the "Vallourec definition". Vallourec is a publisher of data on dope tests but the findings of the present applicants indicate that Vallourec extrapolate a torque correction factor by using the ratio of torques 3 and 1 indicated in FIG. 5, now shown to be unjustified.

The basic aim of the tests of FIGS. 7 to 10 was to simulate conditions where the pin end contacts the shoulder (FIGS. 1 and 2) while eliminating thread and seal effects. The tests showed that where liquid components of a conventional dope are squeezed or otherwise remove from a loaded area, the methods of the present invention give a much lower coefficient of friction than API modified dope.

FIG. 7a–d illustrates the shapes of the torque turns curves recorded. Examining FIG. 7a, with API modified dope, the torque must reach a certain level before movement commences. A sharp drop follows in torque to typically ⅔ of the initial value. Then as motion continues there is a rise in torque for the first ⅛ of a turn. Following this, the torque levels off.

FIG. 7b shows, for a liquid torque modifier in accordance with the invention but without PTFE, a similar characteristic to API dope, but without levelling off. A liquid torque modifier in accordance with the invention with PTFE (FIGS. 7C, 7D) gives a reducing torque at low contact pressures, and a slightly increasing torque at higher contact pressures.

Figure 8:
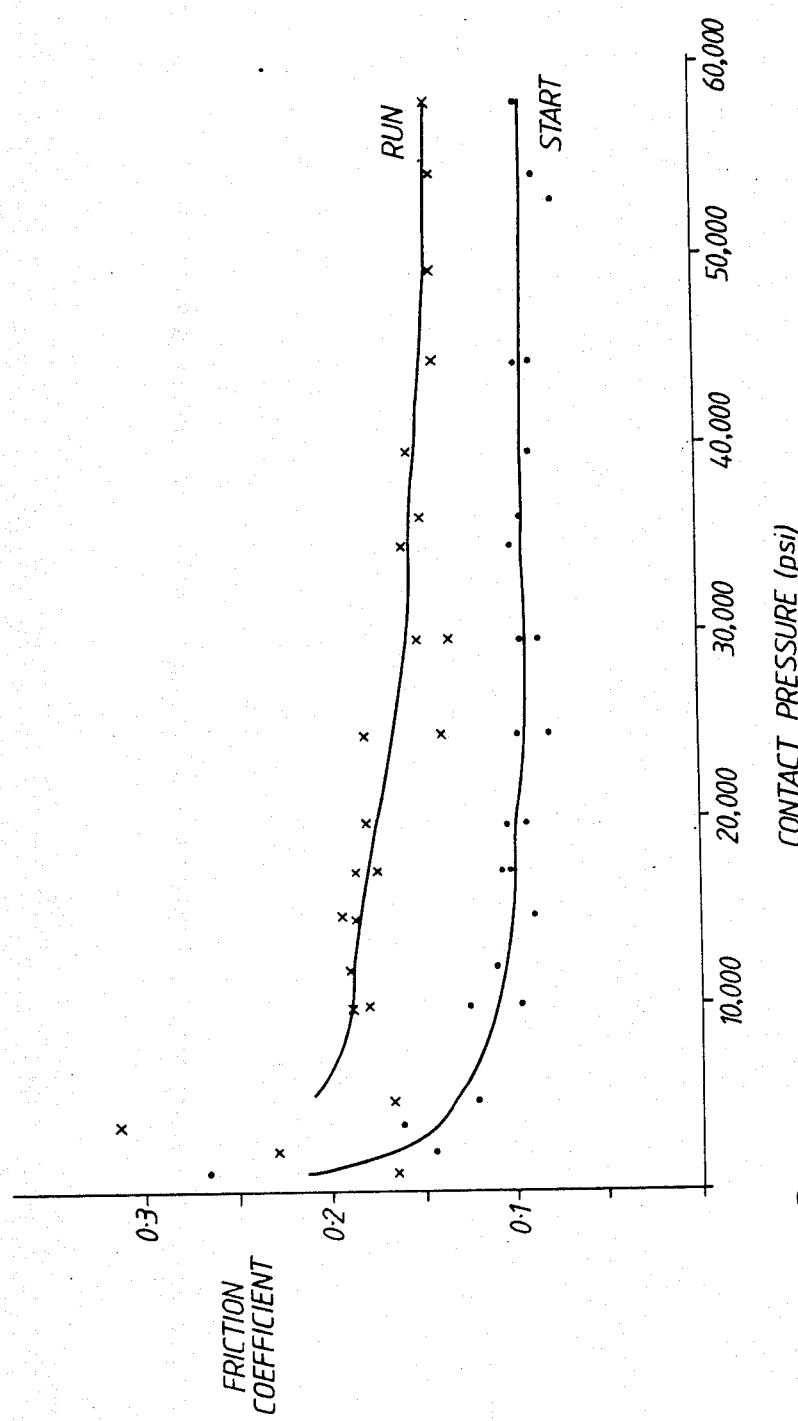
FIGS. 8 to 10 are graphs plotting friction coefficient against contact pressure for various methods and materials in accordance with the invention.
Figure 9:
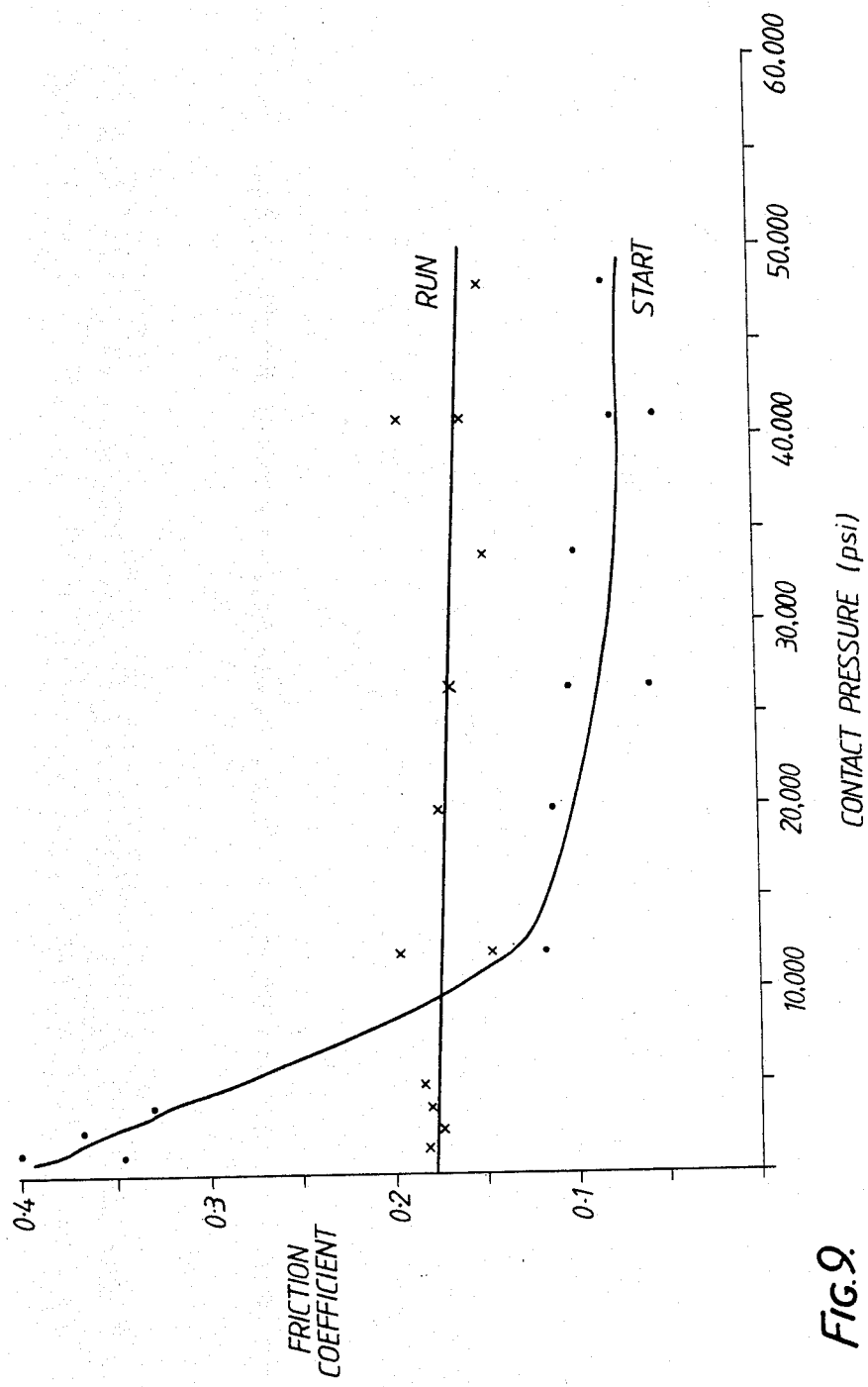
Figure 10:
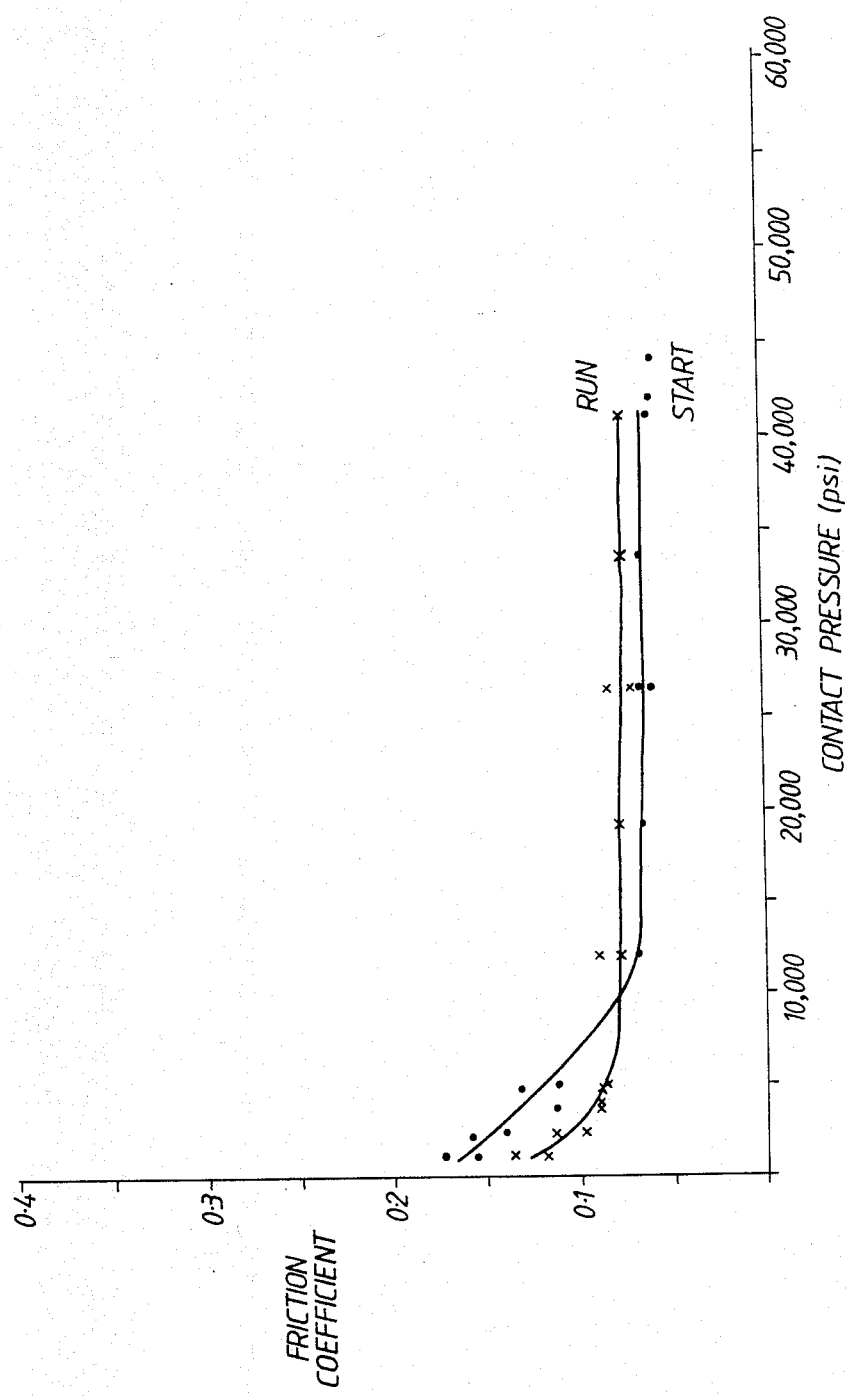

FIGS. 8, 9 and 10 show the test results in the form of friction coefficient v contact pressure. Two curves are shown on each graph labelled 'start' and 'run'. 'Start' is derived from the threshold torque required before rotation commences. 'Run' is calculated from the torque after ¼ turn.

Two common features are apparent from these graphs. Firstly, the coefficient of friction is higher at low contact pressures. Secondly, the friction during motion is higher than the starting friction, with the exception at low loads of liquid torque modifiers in accordance with the invention and with PTFE. Most important, under these test conditions, where liquid components can flow out of the contact area, the coefficient of friction of API modified dope is at least twice that of liquid torque modifiers in accordance with the invention and with PTFE.

When examining the test pieces after each run, the API modified dope left a dry, oil-free contact circle of compacted solids. At higher contact pressures, this material was difficult to remove even when using a flat scraper. The liquid torque modifier samples in accordance with the invention produced a burnished contact circle, and this was visibly wet with liquid torque and modifier.

When this wetness was first observed, it was assumed that it was caused by excess liquid torque modifier draining back when the test pieces were separated. For subsequent tests, the excess was wiped away before the clamping pressure was removed. Subsequently on separating the test pieces, the wet film of liquid torque modifier was always observed. A possible explanation of this is that the liquid torque modifier is forced by the pressure into the porous matrix of the dry lubricant in accordance with the invention.

The pressure may then act to close up the pores, preventing the liquid torque modifier from escaping sideways. On removing the clamping load, air under pressure in the pores may force the liquid torque modifier back to the surface to become visible.

Overall, the superiority of the methods in accordance with the invention in comparison with prior methods is readily apparent.

I claim:

1. A method of protecting mating screw thread means including first and second screw threads and associated sealing surfaces at least under tightening torques, the method comprising the steps of
    applying a dry film lubricant to the screw thread means,
    applying a liquid lubricant to the screw thread means,
    mating the screw thread means, and
    tightening to the required torque value,
    the liquid lubricant having substantially no solvent action on the dry film lubricant, good wetability and low viscosity and being non-volatile and non-chemically reactive, and
    the method serving both to protect the mating threads and to avoid any subsequent masking of any leakage path between the screw-threads.

2. A method according to claim 1, wherein the dry film lubricant is initially sprayed on to the first screw thread and the liquid lubricant is subsequently sprayed on to the first screw thread.

3. A method according to claim 2 wherein the first screw thread is a female thread.

4. A method according to claim 1 wherein the dry film lubricant incorporates soft metal flakes.

5. A method according to claim 4, wherein the soft metal flakes are of copper.

6. A method according to claim 4, wherein the soft metal flakes are present in the dry film lubricant as applied to the screw thread means in the range of 1 to 10% by weight of the total mixture.

7. A method according to claim 1, wherein the liquid lubricant is a fluorocarbon.

8. A method according to claim 6 wherein the fluorocarbon is a perfluoropolyether.

9. A method according to claim 1, wherein finely-divided polytetrafluroethylene is incorporated in the liquid lubricant in the range up to 20% by weight.

10. A method according to claim 9 wherein the PTFE is incorporated as about 6.5% by weight of the liquid lubricant.

11. A method according to claim 9, wherein the particle size of the PTFE is in the range 0.5 to 50 microns.

12. A method according to claim 1, wherein prior to the application of the liquid lubricant a corrosion inhibitor is applied to the dry film lubricant.

13. A method according to claim 1, wherein the dry film lubricant incorporates a corrosion inhibitor.

14. A method according to claim 1, wherein the liquid lubricant incorporates a corrosion inhibitor.

15. A method of protecting the screw threads and associated sealing surfaces of mating screw-threaded members at least under tightening torques, the method comprising the steps of
    spraying a dry film lubricant incorporating soft metal flakes having a thickness in the range 15 to 150 microns in a volatile carrier on to one of the screw-threads,
    allowing the carrier to evaporate and the dry film to harden, then
    applying a liquid lubricant to one of the screw-threads,
    mating the screw-threads, and tightening to the required torque value,
    the liquid lubricant having good wetability and low viscosity and being non-volatile and non-chemically reactive, and
    the method serving to protect the screw-threads and sealing surfaces against mutual damage and to prevent masking of any leakage path under test conditions.

16. A method according to claim 1 wherein the dry film lubricant includes molybdenum disulphide.

17. A method according to claim 15, wherein the dry film lubricant includes molybdenum disulphide.

18. A method according to claim 1 wherein the dry film lubricant is colloidal graphite.

19. A method according to claim 15, wherein the dry film lubricant is colloidal graphite.

20. A method according to claim 1 wherein the dry film lubricant is selected from one of the polytetrafluorethylenes.

21. A method according to claim 15, wherein the dry film lubricant is selected from one of the polytetrafluorethylenes.

22. A method according to claim 1 wherein the dry film lubricant as applied to the screw thread is in a low viscosity carrier.

23. A method according to claim 22, wherein the carrier is selected from the group trichlorethylene, trichlorethane and fluorchlorhydrocarbons.

24. A method according to claim 22 wherein the low viscosity carrier includes a ketonic resin.

25. A method according to claim 22 wherein the proportion of dry film lubricant in the carrier is in the range 0.5% to 25%.

26. A method according to claim 1 wherein the liquid lubricant is aqueous.

27. A method according to claim 15 wherein the liquid lubricant is aqueous.

28. A method according to claim 1 wherein the dry film lubricant incorporates finely-divided PTFE.

29. A method according to claim 28 wherein the size of the PTFE particles is in the range of 0.5 to 50 microns.

30. A method according to claim 28, wherein the amount by weight of PTFE in the dry lubricant is up to 20%.

31. A method according to claim 1 wherein prior to the application of the liquid lubricant a corrosion inhibitor is applied to the screw thread which is to receive the dry film lubricant.

32. A method according to claim 15 wherein prior to the application of the liquid lubricant a corrosion inhibitor is applied to the screw thread which is to receive the dry film lubricant.

33. A method according to claim 15 wherein the dry film lubricant incorporates soft metal flakes in order to increase its load carrying capacity.

34. A method according of protecting the screw threads and associated sealing surfaces of mating screw-threaded members at least under tightening torques, the method comprising the steps of spraying a dry film lubricant incorporating soft metal flakes having a thickness in the range 15 to 150 microns in a volatile carrier on to one of the screw-threads, allowing the carrier to evaporate and the dry film to harden, then applying a liquid lubricant to one of the screw-threads, mating the screw-threads, and tightening to the required torque value, the liquid lubricant having a good wettability and low viscosity and being non-volatile and non-chemically reactive and the method serving to protect the screw-threads and sealing surfaces against mutual damamge and to prevent masking of any leakage path under test conditions.

* * * * *